R. F. HUBER.
FLYING MACHINE.
APPLICATION FILED DEC. 23, 1911.
1,049,486.
Patented Jan. 7, 1913.
2 SHEETS—SHEET 2.
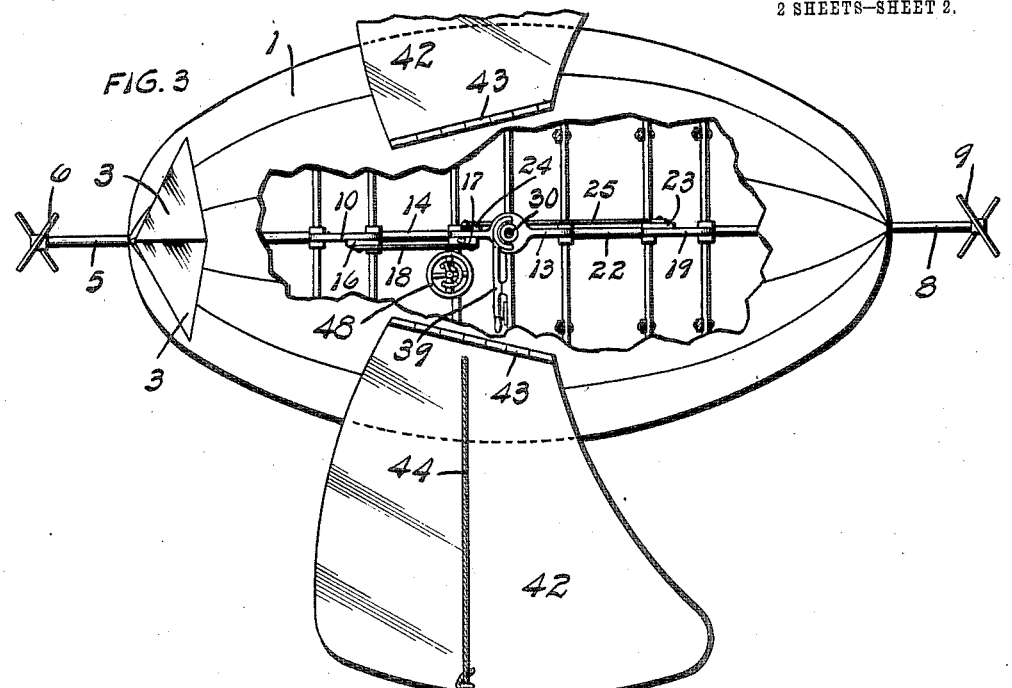
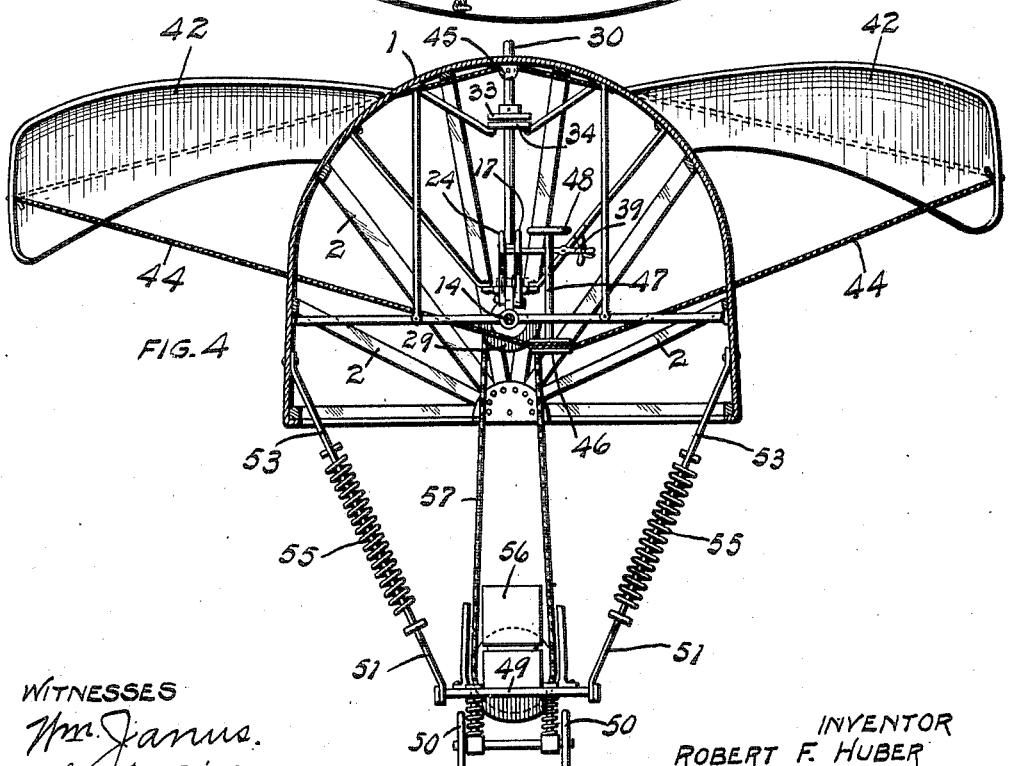
WITNESSES
Wm. Janus.
J. A. Bishop
INVENTOR
ROBERT F. HUBER
BY ATT'Y.

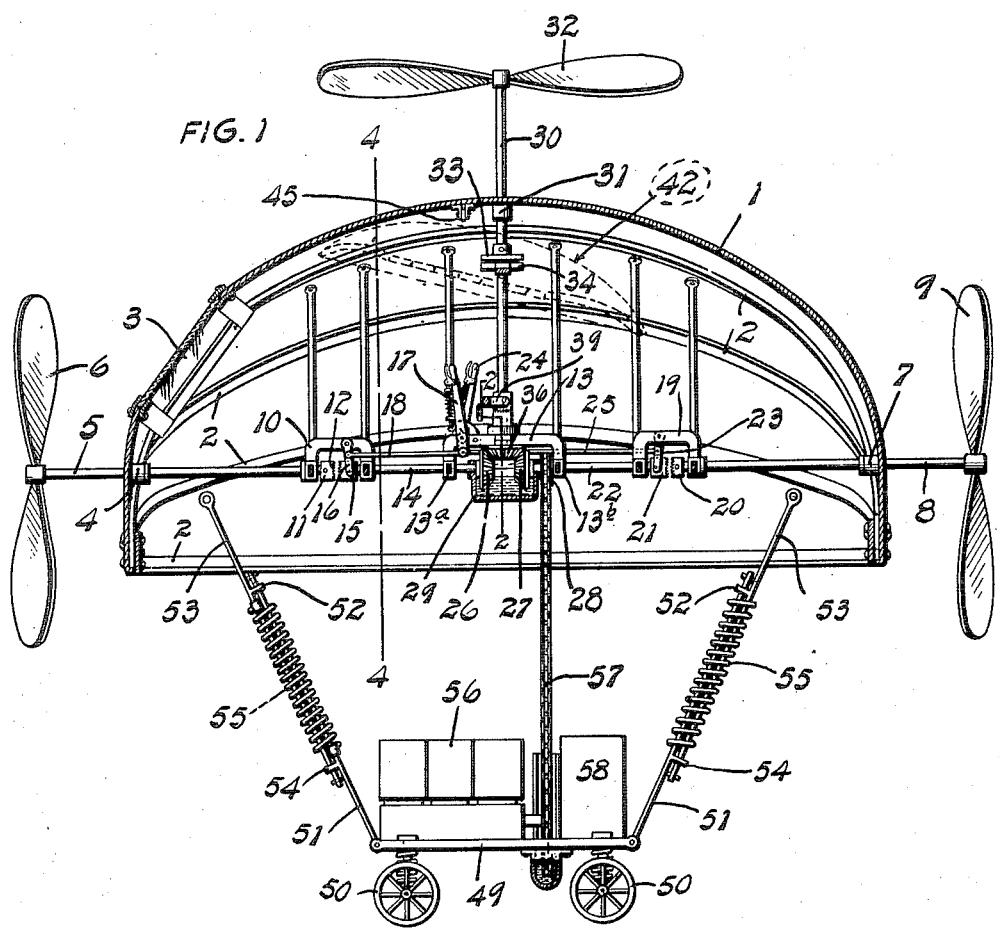

UNITED STATES PATENT OFFICE.

ROBERT F. HUBER, OF ST. LOUIS, MISSOURI.

FLYING-MACHINE.

1,049,486.

Specification of Letters Patent.

Patented Jan. 7, 1913.

Application filed December 23, 1911. Serial No. 667,490.

*To all whom it may concern:*

Be it known that I, ROBERT F. HUBER, a citizen of the United States, residing at St. Louis, Missouri, have invented a certain new and useful Improvement in Flying-Machines, of which the following is a full, clear, and exact description, such as will enable others skilled in the art to which it appertains to make and use the same, reference being had to the accompanying drawings, forming part of this specification, in which—

Figure 1 is a vertical section taken lengthwise through the center of a flying machine of my improved construction. Fig. 2 is an enlarged detail taken approximately on line 2—2 of Fig. 1 and illustrating the gearing between the countershaft which extends lengthwise through the machine and the vertically disposed shaft upon which the lifting propeller is mounted. Fig. 3 is a plan view of the machine with the central portion of the housing, which forms the body of the machine, broken away. Fig. 4 is a cross section taken approximately on the line 4—4 of Fig. 1.

My invention relates to a flying machine wherein propeller blades or wheels are utilized for lifting the machine and driving the same forward, and which machine is equipped with a pair of laterally disposed wings or planes which are shifted to guide the plane laterally during flight.

The principal objects of my invention are, first, to construct a flying machine with a body or shell which is hemi-ovoidal in shape and which body or shell incloses and covers the operator of the machine so that said operator is protected against the pressure resulting from the rush of air during the forward flight of the machine; second, to arrange propellers above and at each end of the frame or shell to provide means for independently throwing any one of the propellers into service; third, to arrange the engine and fuel tank upon a wheeled platform or truck and to suspend the same a substantial distance below the body or shell of the machine, so that said shell or body will, in effect, perform the function of a parachute in case the engine, or any part of the operating mechanism of the machine, becomes inoperative; and, fourth, to suspend the wheeled truck carrying the engine and fuel tank by means of connections which include springs, so that in case the machine suddenly descends to the ground, the body or shell and carried parts will not be injured as a result of the sudden impact of the engine and fuel tank with the ground.

To the above purposes my invention consists in certain novel features of construction and arrangement of parts hereinafter more fully described and claimed.

Referring by numerals to the accompanying drawings, 1 designates the body of my improved flying machine, which is in the form of a hemi-ovoidal shell preferably constructed of light weight sheet metal arranged upon a series of longitudinally extending ribs 2. Located in the front portion of the shell thus formed is a glazed opening 3 which forms an observation window for the operator of the machine.

Located at the forward end of the body of the machine and upon the wall or framework is a bearing 4 and journaled for rotation therein is a horizontally disposed shaft 5, the forward end of which carries a propeller 6. A corresponding bearing 7 is arranged at the rear end of the frame 1 and journaled for rotation therein is a shaft 8 carrying on its rear end a propeller 9.

10 designates a bracket which is carried by suitable supports in the forward portion of the body 1 and the rear end of the shaft 5 is journaled in this bracket, and said rear end carries a disk 11 having a clutch face 12.

13 designates a bracket which is carried by suitable braces at a point near the center of the body 1, and formed on the ends of said bracket are journal boxes 13ª and 13ᵇ. A shaft 14 is journaled in the bearing 13ª, and in a bearing formed on the bracket 10 and arranged to slide lengthwise upon and to rotate with the shaft 14 within the bracket 10 is a disk 15 provided with a clutch face which is adapted to engage with a clutch face 12 on the disk 11. A yoke 16 is pivotally mounted on the bracket 10 and engages the disk 15 to move the same backward and forward upon the shaft 14, and this yoke is operated by means of a hand lever 17, which is fulcrumed on the bracket 13 and connected to the yoke 15 by a rod 18.

19 designates a bracket corresponding to the bracket 10, and which bracket 19 is mounted upon suitable supports between the bracket 13 and the rear end of the body 1, and journaled in the rear end of this bracket 19 is the forward end of the shaft 8.

Fixed upon the forward end of the shaft 8 is a disk 20 provided with a clutch face, and adapted to engage with said clutch face is a corresponding clutch face formed on a disk 21, which latter is mounted to slide lengthwise upon and rotate with a shaft 22 which is journaled for rotation in the bearing 13$^b$, and a bearing formed on the forward end of the bracket 19. The disk 21 is moved backward and forward by means of a yoke 23 which is pivoted to the bracket 19, said yoke being actuated by means of a hand lever 24, which latter is fulcrumed on the bracket 13 and its lower ends connected to the yoke 23 by a rod 25.

Fixed upon the end of the shaft 14 within the bracket 13 is a beveled pinion 26 and fixed upon the adjacent end of the shaft 22 is a similar beveled pinion 27. A sprocket wheel 28 is fixed upon the shaft 22 adjacent the pinion 27, and suspended from the ends of the shafts 14 and 22 between the ends of the brackets 13 is a receptacle 29, which is partially filled with a lubricant, such as oil.

30 designates a vertically disposed shaft which passes through a bearing 31 in the top of the shell or body 1, and carried by the upper end of this shaft is a lifting propeller 32. Fixed on this shaft 30 inside the body 1 is a disk 33 which operates on ball bearings carried by a disk 34 which latter is supported by suitable brackets within the shell or body. The lower end of this shaft 30 extends downward through the bracket 13 and fixed on said lower end is a disk 35. Loosely mounted on the shaft immediately above this disk is a beveled pinion 36 which is constantly in mesh with the pinions 26 and 27. The disk 35 bearing against the pinion 36 performs the function of a thrust bearing for the shaft 30. A hub 37 is formed integral with the pinion 36, said hub operating in a bearing formed in the bracket 13, and formed in the bracket 13 and formed on the upper end of said hub is a clutch face adapted to be engaged by a corresponding clutch face formed on the underside of a collar 38, which latter is arranged to slide vertically upon and rotate with the shaft 30. The collar 38 is raised and lowered by means of a hand lever 39, the same being provided with a latch 40 which engages a segment 41 for the purpose of locking said lever in either one of its set positions.

42 designates planes preferably constructed of thin sheet metal or fabric stretched over frames, and these planes are hinged at 43 to the sides of the body 1, and said planes are slightly curved in cross section and are arranged with their front edges slightly higher than their rear edges. These planes are manipulated by means of a cord or cable 44 which is secured to the outer ends of the central portions of said planes and said cable passes through suitable openings formed in the top of the shell or housing 1 and operates over a pulley 45, which latter is journaled in suitable bearings within the shell and at the top thereof. The ends of the cable 44 extend over the ends of the planes 42 through suitably formed openings in the sides of the shell or body 1, and said ends pass around a drum 46, which latter is carried by the lower end of a vertically disposed shaft 47 provided on its upper end with a hand wheel 48. This shaft is journaled for rotation in suitable bearings at a point adjacent to the hand levers 17 and 24 so as to be conveniently manipulated by the operator of the machine.

49 designates a platform which is positioned a short distance below the center of the shell or housing 1 and yieldingly mounted beneath this platform are wheels 50. Pivotally connected to the corners of the platform 49 are rods 51 which extend upward through loops 52, which latter are formed on rods 53, the upper ends of which are pivotally connected to the lower portion of the shell or housing 1. The lower ends of these rods 53 extend through loops 54 carried by the rods 51 and inclosing the over-lapped portions of the rods 51 and 53 are heavy coil springs 55, the upper ends of which are connected to the rods 53 and the lower ends to the rods 51. The construction just described provides means whereby the platform 49 and carried parts are yieldingly suspended below the center of the shell or housing 1, and in case the machine should, through accident, fall while making a flight the force of the impact between the wheels and the ground will be taken up and absorbed by the springs 59 and the springs between the wheels and the platform 49.

Mounted on the platform 49 is a motor 56 preferably in the form of an internal combustion engine, and carried by the crank shaft of said engine is a sprocket wheel which is in vertical alinement with the sprocket wheel 28, and connecting these two wheels is a sprocket chain 57.

58 designates a tank or receptacle adapted to contain liquid hydro-carbon used as fuel in the internal combustion engine.

To operate my improved flying machine the engine 56 is started and the rotary motion of the crank shaft is imparted to the shaft 22 by means of the sprocket chain 57. The disks 15 and 21 are moved so that the clutch faces thereon are disengaged from the clutch faces on the disks 11 and 20 and the lever 39 is manipulated so as to move the clutch face 38 into engagement with the clutch face on the hub 37 of the pinion 36. Thus rotary motion of the shaft 22 is imparted to the vertically disposed shaft 30, thereby revolving the lifting propeller 32 and during this operation the shaft 14 runs idle. The lifting propeller 32 during operation raises the machine vertically until the desired altitude is reached, and to move forward the operator now manually operates the hand levers 17 and 24 to shift the disks 15 and 21 so that the clutch faces thereon engage with the corresponding clutch faces on the disks 11 and 20. Thus the shafts 5 and 8 are rotated and the propellers mounted on the ends of said shafts drive the machine forward. The blades of the propellers 6 and 9 are oppositely disposed with respect to one another so that in operation the impingement of the air upon the blades during operation is equalized at the ends of the machine, and therefore there is no tendency of the machine to move laterally in either direction during forward flight. To effect a turn in either direction the operator manually engages the hand wheel 48 and rotates the shaft 47, thereby shifting the position of the cord or cable 44, and consequently, tilting the planes 42. When the upper end of one plane is lifted the outer end of the opposite plane is lowered, and thus the machine can be caused to turn to one side or the other as desired during forward flight.

If, for any reason, the machine becomes inoperative during flight, the movement toward the earth will be comparatively slow for the reason that the shell or housing 1 will act as a parachute to impinge on the air during downward movement of the machine thereby materially retarding its downward movement, and when the wheels 50 engage the ground the springs between said wheels and the platform 49 together with the springs 50 will absorb any sudden jar or shock, thereby protecting the body of the machine, together with the operator and the mechanism therein.

The engine 56 and fuel tank 58 are comparatively heavy, and in my improved construction these parts are suspended a substantial distance below the body of the machine, and thus the center of gravity is lowered, and in case the machine drops during flight the weight suspended beneath the shell 1 prevents the same from turning over. The sprocket chain 57 provides a flexible connection between the crank shaft of the engine and the counter-shaft will not be distorted or thrown out of position as a result of sudden contact of the truck with the ground.

A flying machine of my improved construction is comparatively simple in construction and operation and by the peculiar construction of the shell or body and the disposition of the weight of the engine and fuel tank a maximum degree of safety is afforded to the operator of the machine in case said machine should become inoperative during flight.

It will be readily understood that minor changes in the size, form and construction of the various parts of my improved flying machine can be made and substituted for those herein shown and described without departing from the spirit of my invention, the scope of which is set forth in the appended claims.

I claim:

1. In a flying machine, a hemi-ovoidal shaped body, means carried by said body for propelling the same through the air, planes hinged to said body and projecting laterally therefrom, and means for operating said planes comprising a cable attached to the outer ends of said planes, a portion of which cable passes over said planes across the top of the body, and the remaining portions of which cable pass beneath the planes through the body, and a pulley mounted for rotation within the body around which a part of the lower portion of the cable is wound.

2. In a flying machine, a body composed of a hemi-ovoidal shaped shell, a weight suspended from said shell a substantial distance below the bottom thereof, rods projecting upwardly from the weight, corresponding rods extending downwardly from the body, and compression springs arranged upon and fixed to the corresponding pairs of rods.

3. In a flying machine, a body in the form of a hemi-ovoidal shaped shell, propelling means on said body, a motor for operating said propelling means which motor is suspended from said shell a substantial distance below the bottom thereof, rods depending from the body, corresponding rods extending upward from the motor support, and compression springs arranged upon and fixed to the pairs of rods.

4. In a flying machine, the combination with a body in the form of a hemi-ovoidal shaped shell, of propelling means for said body, a motor for driving said propelling means which motor is positioned a substantial distance below the bottom of the shell, and yielding connections from the shell to the motor comprising rods depending from the shell, corresponding rods projecting upwardly from the motor support, and compression springs arranged upon and fixed to said rods.

5. In a flying machine, the combination with a hemi-ovoidal shaped body, of propelling means on said body, a truck positioned a substantial distance below the bottom of the shell, yielding connections between said truck and the shell comprising rods depending from the body, corresponding rods projecting upwardly from the truck, and compression springs located on the corresponding pairs of rods, a motor on the truck, and a flexible connection between said motor and the propelling means on the shell.

6. The herein described flying machine comprising a body in the form of a hemi-ovoidal shaped shell, a lifting propeller above the body, a motor for operating said propellers which motor is suspended a substantial distance below the bottom of the shell, means whereby the propellers may be individually and simultaneously operated, steering planes hinged to the body and projecting laterally therefrom, a cable attached to the outer ends of the planes, a portion of which cable passes above said planes through the top of the shell, and a portion of which cable passes beneath the planes through the lower portion of the shell, and a pulley mounted for rotation within the shell upon which pulley a part of the cable is wound.

In testimony whereof I hereunto affix my signature in the presence of two witnesses, this 25th day of November, 1911.

ROBERT F. HUBER.

Witnesses:
M. P. SMITH,
JESSIE CLARK.